(12) United States Patent
Seidler

(10) Patent No.: US 11,454,505 B2
(45) Date of Patent: Sep. 27, 2022

(54) NAVIGATION SYSTEM AND METHOD FOR DISCREET ROUTING

(71) Applicant: Accenture Global Solutions Limited, Dublin (IE)

(72) Inventor: Claudio Peter Daniel Seidler, Berlin (DE)

(73) Assignee: Accenture Global Solutions Limited, Dublin (IE)

(*) Notice: Subject to any disclaimer, the term of this patent is extended or adjusted under 35 U.S.C. 154(b) by 325 days.

(21) Appl. No.: 16/551,041

(22) Filed: Aug. 26, 2019

(65) Prior Publication Data
US 2020/0318984 A1    Oct. 8, 2020

(51) Int. Cl.
| | | |
|---|---|---|
| G01C 21/34 | (2006.01) | |
| G01C 21/36 | (2006.01) | |
| G06Q 10/04 | (2012.01) | |
| G06K 9/00 | (2022.01) | |
| G06V 20/56 | (2022.01) | |

(52) U.S. Cl.
CPC ..... *G01C 21/3461* (2013.01); *G01C 21/3694* (2013.01); *G01C 21/3697* (2013.01); *G06Q 10/047* (2013.01); *G06V 20/56* (2022.01)

(58) Field of Classification Search
CPC ............ G01C 21/3461; G01C 21/3694; G01C 21/20; G01C 21/3881; G01C 21/3697; G06K 9/00791; G06Q 10/047; G06V 20/56
See application file for complete search history.

(56) References Cited

U.S. PATENT DOCUMENTS

| | | | | |
|---|---|---|---|---|
| 9,542,849 | B1 * | 1/2017 | Bertram | G08G 5/0086 |
| 2011/0052042 | A1 * | 3/2011 | Ben Tzvi | G06T 19/006 |
| | | | | 382/154 |
| 2013/0124089 | A1 * | 5/2013 | Herman | G01C 21/20 |
| | | | | 701/528 |
| 2016/0210863 | A1 * | 7/2016 | Kohn-Rich | G08G 5/0086 |

FOREIGN PATENT DOCUMENTS

| | | |
|---|---|---|
| DE | 102019002574 A1 | 10/2020 |
| EP | 1693649 A2 | 8/2006 |
| EP | 3722750 A2 | 10/2020 |

OTHER PUBLICATIONS

Extended European Search Report dated Dec. 22, 2020 for European Patent Application No. 20166111.3.
Partial European Search Report dated Aug. 17, 2020 for European Patent Application No. 20166111.3.

* cited by examiner

*Primary Examiner* — Nga X Nguyen
(74) *Attorney, Agent, or Firm* — Plumsea Law Group, LLC

(57) ABSTRACT

A system and method for discreet routing of a vehicle are described. The system and method provide a way of getting a subject vehicle from Point A to Point B while minimizing the visibility of the subject vehicle by one or more observers. In one embodiment, the method includes (1) determining a location of one or more observers within a target area and (2) applying elevation data to a plurality of grid squares within the target area. Based on the elevation data, a field-of-view (FOV) for each of the one or more observers is determined. The FOV includes one or more of the plurality of grid squares that are visible from the location of the observer. The method includes determining a route from an initial location to a destination location within the target area that minimizes an amount of the route within the FOV of the one or more observers.

20 Claims, 9 Drawing Sheets

NAVIGATION SYSTEM AND METHOD FOR DISCREET ROUTING

PRIORITY CLAIM

This application claims the benefit of priority under 35 U.S.C. § 119 to German patent application number 10 2019 002 574.1, filed on Apr. 8, 2019.

TECHNICAL FIELD

The present disclosure generally relates to vehicle navigation systems. More specifically, the present disclosure generally relates to a system and method for discreet routing for a vehicle.

BACKGROUND

Conventional vehicle navigation systems are configured to plan efficient routes for vehicles to travel between destinations, often taking into account factors such as travel times, traffic conditions, and distances between the destinations. Conventional vehicle navigation systems constrain vehicles to designated travel corridors, such as paved or unpaved roads. However, conventional vehicle navigation systems do not provide strategic routing that accounts for other factors, such as adapting a travel route to a fixture located off a roadway, such as an observer.

SUMMARY

The example embodiments provide a system and method for discreet routing that automatically determines an optimal route that avoids or minimizes the portion of the route that falls within a field-of-view of one or more observers or potential observers. The system and method solve the problems discussed above by generating a route for subject vehicles that minimizes the field-of-view of known and/or unknown observers, as well as other requirements or vehicle restrictions and/or limitations. The field-of-view of a subject vehicle corresponds with the field-of-view of observers of the subject vehicle. For example, if the subject vehicle can see an observer, then it is likely that the same observer can see the subject vehicle. Accordingly, in some embodiments, the system and method may minimize the field-of-view of unknown observers by using the field-of-view of the subject vehicle to determine the optimal route. In other embodiments, the system and method may minimize the field-of-view of known observers by using the location of one or more observers to determine the optimal route. Generated routes may include segments on a roadway (paved or unpaved) or off a roadway that are traversable in the vehicle, such as a field, ravine, stream bed, hillside, etc. The discreet route determining system may be incorporated into a larger system. For example, the route determining system of the example embodiments is used in the context of military operations and may be integrated into a battlefield management system to provide optimized tactical routing for a variety of military and other vehicles.

In one aspect, a method for determining a route for a subject vehicle is provided, the method comprising: identifying a first observer, the first observer having a first location, the first observer being within a target area, and the target area comprising a plurality of grid squares; identifying a second observer, the second observer having a second location, and the second observer being within the target area; obtaining the first location for the first observer and the second location for the second observer; applying elevation data to the plurality of grid squares within the target area; determining a first field-of-view (FOV) for the first observer and a second FOV for the second observer, the first FOV and the second FOV both based on the elevation data, the first FOV including one or more of the plurality of grid squares that are visible from the first location, the second location including one or more of the plurality of grid squares that are visible from the second location; and determining a route for the subject vehicle, the route traversing from an initial location to a destination location, the initial location and the destination location within the target area, and the route determined to minimize an amount of the route being within the first FOV and an amount of the route being within the second FOV.

In another aspect, a system for determining a route for a subject vehicle is provided, the system comprising: at least one interface configured to receive data; a memory in communication with the at least one interface; and a processor in communication with the at least one interface and the memory, wherein the processor is configured to: apply elevation data to a plurality of grid squares within a target area; based on the elevation data, determine a field-of-view (FOV) for the subject vehicle, wherein the FOV includes one or more of the plurality of grid squares that are visible from the location of the subject vehicle; and determine a route from a first location to a second location within the target area that minimizes an amount of the route within the FOV of the subject vehicle.

In another aspect, one or more non-transitory computer readable storage media encoded with instructions are provided that, when executed by a processor of a route determining system, causes the processor to: obtain a location of one or more observers within a target area, the target area comprised of a plurality of grid squares; apply elevation data to the plurality of grid squares within the target area; determine a field-of-view (FOV) for each of the one or more observers, the FOV based on the elevation data, wherein the FOV includes one or more of the plurality of grid squares that are visible from the location of the observer; and determine a route from a first location to a second location within the target area, the route determined to minimize an amount of the route being within the FOV of the one or more observers.

In another aspect, a method of determining a route for a subject vehicle is provided, the method comprising: obtaining a location of one or more observers within a target area; applying elevation data to a plurality of grid squares within the target area; based on the elevation data, determining a field-of-view (FOV) for each of the one or more observers, wherein the FOV includes one or more of the plurality of grid squares that are visible from the location of the observer; and determining a route from a first location to a second location within the target area that minimizes an amount of the route within the FOV of the one or more observers.

In another aspect, a system for determining a route for a subject vehicle is provided, the system comprising: at least one interface configured to receive data; a memory; and a processor in communication with the at least one interface and the memory, wherein the processor is configured to: obtain a location of one or more observers within a target area; apply elevation data to a plurality of grid squares within the target area; based on the elevation data, determine a field-of-view (FOV) for each of the one or more observers, wherein the FOV includes one or more of the plurality of grid squares that are visible from the location of the observer; and determine a route from a first location to a second location within the target area that minimizes an amount of the route within the FOV of the one or more observers.

In another aspect, one or more non-transitory computer readable storage media encoded with instructions are provided that, when executed by a processor of a route determining system, causes the processor to: obtain a location of one or more observers within a target area; apply elevation data to a plurality of grid squares within the target area; based on the elevation data, determine a field-of-view (FOV) for each of the one or more observers, wherein the FOV includes one or more of the plurality of grid squares that are visible from the location of the observer; and determine a route from a first location to a second location within the target area that minimizes an amount of the route within the FOV of the one or more observers.

In another aspect, a method of determining a route for a subject vehicle is provided, the method comprising: applying elevation data to a plurality of grid squares within a target area; based on the elevation data, determining a field-of-view (FOV) for the subject vehicle, wherein the FOV includes one or more of the plurality of grid squares that are visible from the location of the subject vehicle; and determining a route from a first location to a second location within the target area that minimizes an amount of the route within the FOV of the subject vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
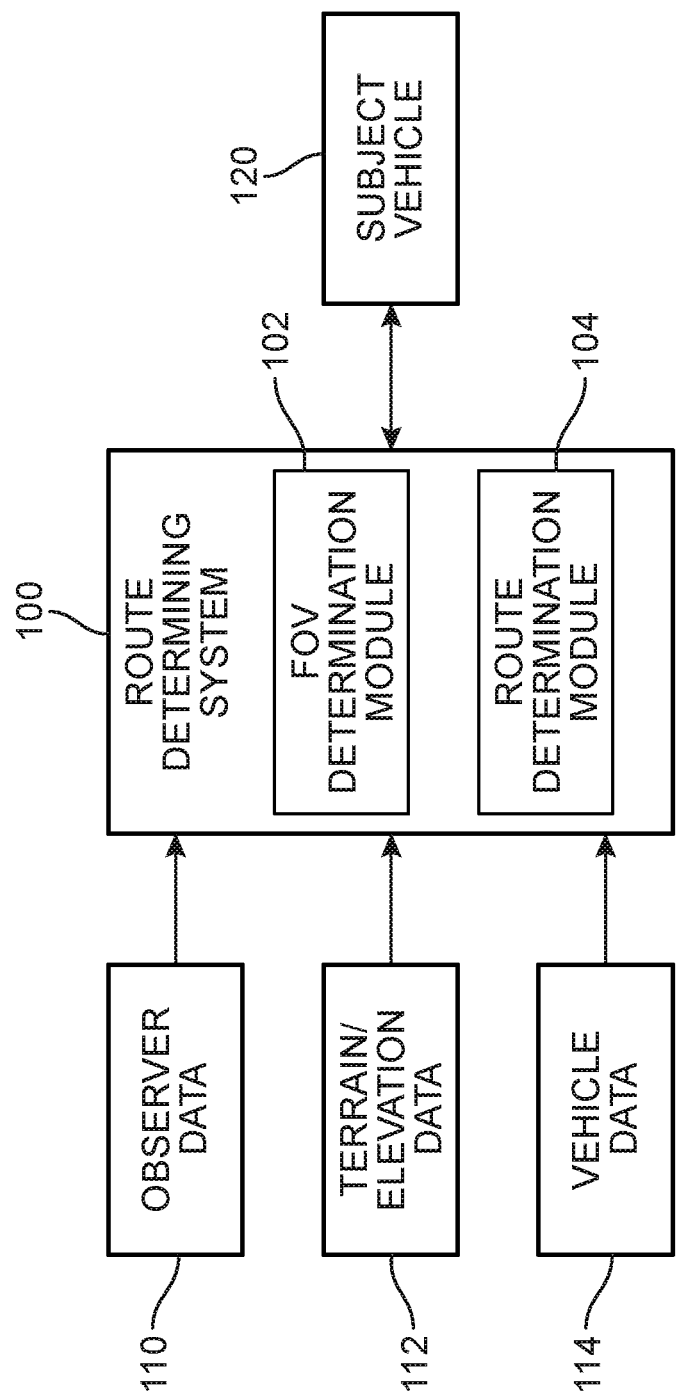
FIG. 1 is a schematic diagram of an example embodiment of a system for discreet routing for a vehicle.

Referring now to FIG. 1, an embodiment of a route determining system 100 for determining a discreet route for a subject vehicle 120 is shown. In this embodiment, route determining system 100 includes a field-of-view (FOV) determination module 102 and a route determination module 104. In some embodiments, FOV determination module 102 is configured to use information associated with locations of one or more observers, for example, obtained from observer data 110, to determine the FOV of the observers relative to a target area. In addition, the FOV determination module 102 is also configured to use information associated with the terrain and/or elevation for the target area, for example, obtained from terrain/elevation data 112, to determine the FOV of the observers relative to the target area.

In some embodiments, an observer may be any party or entity from which detection or observation of a subject vehicle is not desired. For example, a subject vehicle may be carrying a celebrity who does not wish to be seen by an observer (e.g., paparazzi). In other embodiments, a subject vehicle may be carrying a dignitary (e.g., head of government) who is to be shielded from potential threats. In yet other embodiments, in a military context, an observer may be an enemy, or hostile force, that should be avoided by a subject vehicle, for example, in battlefield or other tactical environment. The principles of the example embodiments described herein, therefore, may be applied to any kind of observer, such as a human, an optical device (e.g., camera or other optical sensor), thermal sensing device, etc. The disclosed examples are described in a military context, but it is understood that the disclosed route determining system and method may be used in a variety of contexts. The military examples help demonstrate how the location of potential observers may be determined and how routes through off-road terrain may be considered.

In some embodiments, route determining system 100 may identify one or more observers, including the locations of the observers, using observer data 110. Observer data 110 may include information associated with the identity and/or locations of one or more observers obtained from known sources, such as surveillance feeds, satellite imaging, ground teams, or other intelligence gathering resources. In addition to location information, observer data 110 may include information about a number of observers, types of observers, heights of the observers at the location, associated vehicles, tactical capabilities or equipment, or other information that may assist with determining a potential FOV of an observer. In some cases, observer data 110 may be obtained in advance of determining a route. In other cases, observer data 110 may be obtained from real-time sources. In still other cases, observer data 110 may include both predetermined data and may be supplemented or updated using additional real-time data.

In some embodiments, terrain/elevation data 112 may be obtained from a geographic information system (GIS). The information from GIS may include digital maps of a target area that include various terrain features (e.g., streams, lakes, rivers, ponds, forests, and other natural land formations), man-made features (e.g., highways, roads, streets, buildings, and other types of structures), ground conditions, including unpassable areas, and elevation data for every position (e.g., measured in meters above sea-level (MASL)). Additional information associated with the target area may also be provided from other sources, such as from satellites (e.g., global positioning system (GPS) satellites, weather satellites, etc.), surveys, reconnaissance (e.g., from human observation and/or feeds from drones), or other resources.

In an example embodiment, FOV determination module 102 uses the information from observer data 110 and terrain/elevation data 112 to determine the FOV for each of the one or more observers within the target area. In some embodiments, a combined FOV may be determined for portions of the target area where the FOV of two or more observers overlaps, as will be described in more detail below.

Route determining system 100 may also receive vehicle data 114. In some embodiments, vehicle data 114 may include information associated with one or more subject vehicles for which a discreet route is to be determined by route determining system. For example, vehicle data 114 may include height, weight, cross-sectional area, maximum speed, cargo and/or personnel capacity, terrain limitations, type or class of vehicle, color, armor, identification, equipment, or other information associated with a potential subject vehicle.

Route determination module 104 is configured to use FOV information for the observers (e.g., from FOV determination module 102 and/or observer data 110), map or route information (e.g., from pre-stored maps and/or terrain/elevation data 112), and/or vehicle data 114 for subject vehicle 120 to determine an optimal route for subject vehicle 120 from a first location to a second location within the target area that minimizes an amount of the route within the FOV of the one or more observers. In addition, the route determined by route determination module 104 may also take into account other factors, such as any restrictions or limitations associated with subject vehicle 120, trench or bridge crossings, impassable areas, or other areas to be avoided within the target area (e.g., densely populated areas or areas with high visibility).

In some embodiments, route determination module 104 may optimize the determined route for subject vehicle 120 according to different criteria. For example, an optimal route may include: avoiding any area within the FOV of the one or more known and/or unknown observers, minimizing at least one of a time or distance within the FOV of the one or more observers, minimizing a cross-sectional area of subject vehicle 120 within the FOV of the one or more observers, minimizing a combined area of the FOV of the one or more observers along the determined route, or minimizing a FOV of the subject vehicle along the route. In other embodiments, additional or different criteria may be selected to determine the characteristics for the optimal route for subject vehicle 120 within the target area.

Additionally, in some embodiments, criteria for determining the optimal route for subject vehicle 120 may be ranked in order of importance or priority. For example, route determination module 104 may first attempt to determine a route for subject vehicle 120 that fulfills all necessary requirements (e.g., vehicle restrictions/requirements, location, etc.) while avoiding any FOV of an observer. If such a route is not possible, route determination module 104 may then attempt to determine a route for subject vehicle that minimizes the combined FOV or minimizes the time or distance within the FOV of the one or more observers. Other criteria and priorities for routing may be implemented by route determination module 104.

In some embodiments, no observers may have been previously identified within the target area. The field-of-view of a subject vehicle corresponds with the field-of-view of observers of the subject vehicle. For example, if the subject vehicle can see an observer, then it is likely that the same observer can see the subject vehicle. Thus, minimizing the FOV of the subject vehicle minimizes the potential FOV of unknown observers. Accordingly, in cases where no observers have been identified, route determination module 104 may use the FOV of the subject vehicle to determine an optimal route that minimizes the portion of the route in potential FOVs of unknown observers. For example, by avoiding areas having higher visual exposure (e.g., a hilltop, open fields, etc.) within the target area or prioritizing routes within the target area that include cover to mask or hide subject vehicle 120, the potential FOVs of unknown observers can be minimized. In embodiments where no known observers are located within the target area, the optimal route may be determined by minimizing the FOV of the subject vehicle within the target area. That is, by determining a route for the subject vehicle that includes taking cover in the terrain and minimizing the subject vehicle's own FOV along the route, the probability to be seen by unknown observers is also minimized (i.e., the subject vehicle could be seen from the fewest number of potential observer locations, even if they are unknown).

Figure 2:
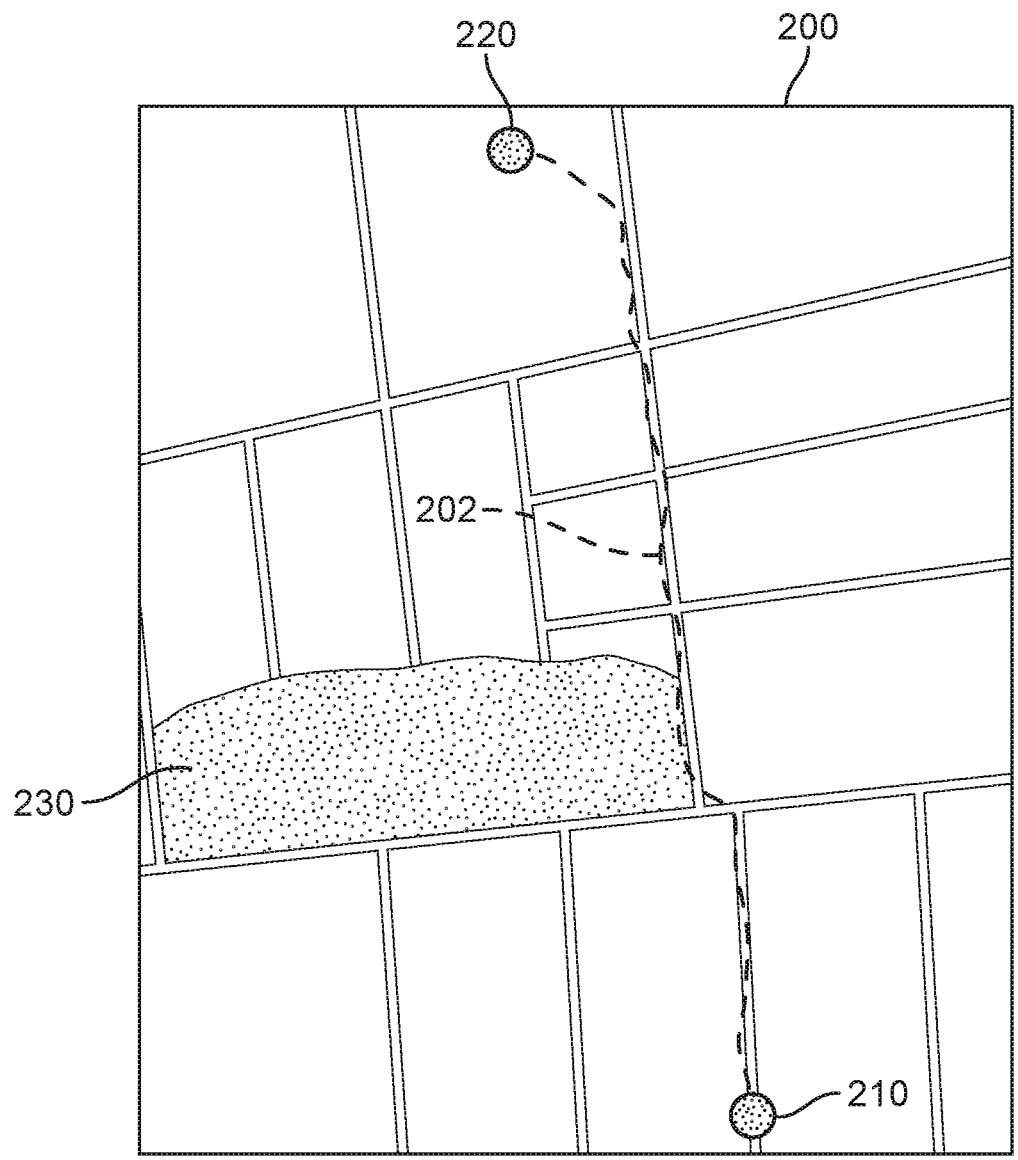
FIG. 2 is a representative diagram of an example embodiment of a route for a vehicle.
Figure 3:
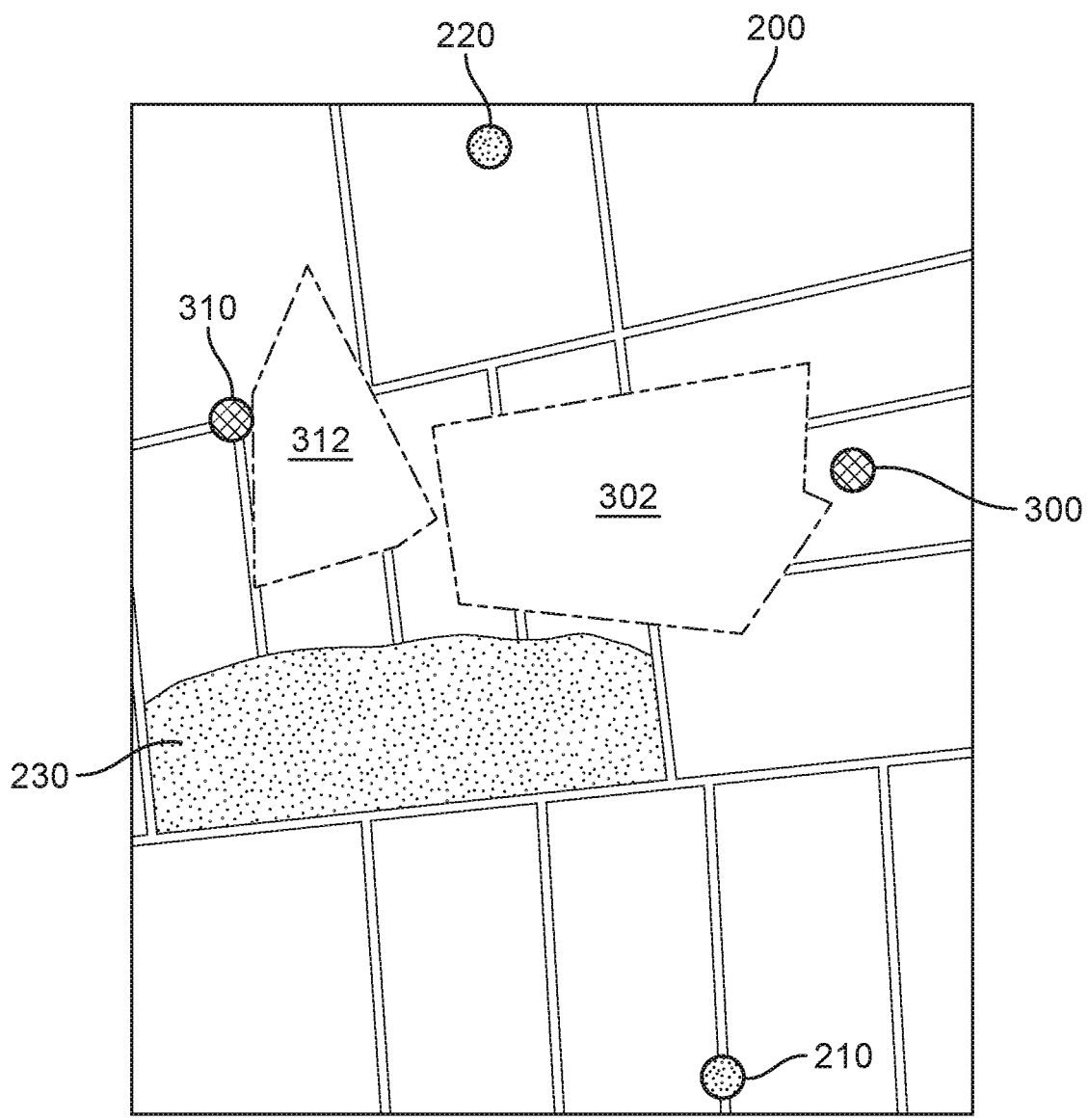
FIG. 3 is a representative diagram of an example embodiment showing a field-of-view (FOV) for observers.
Figure 4:
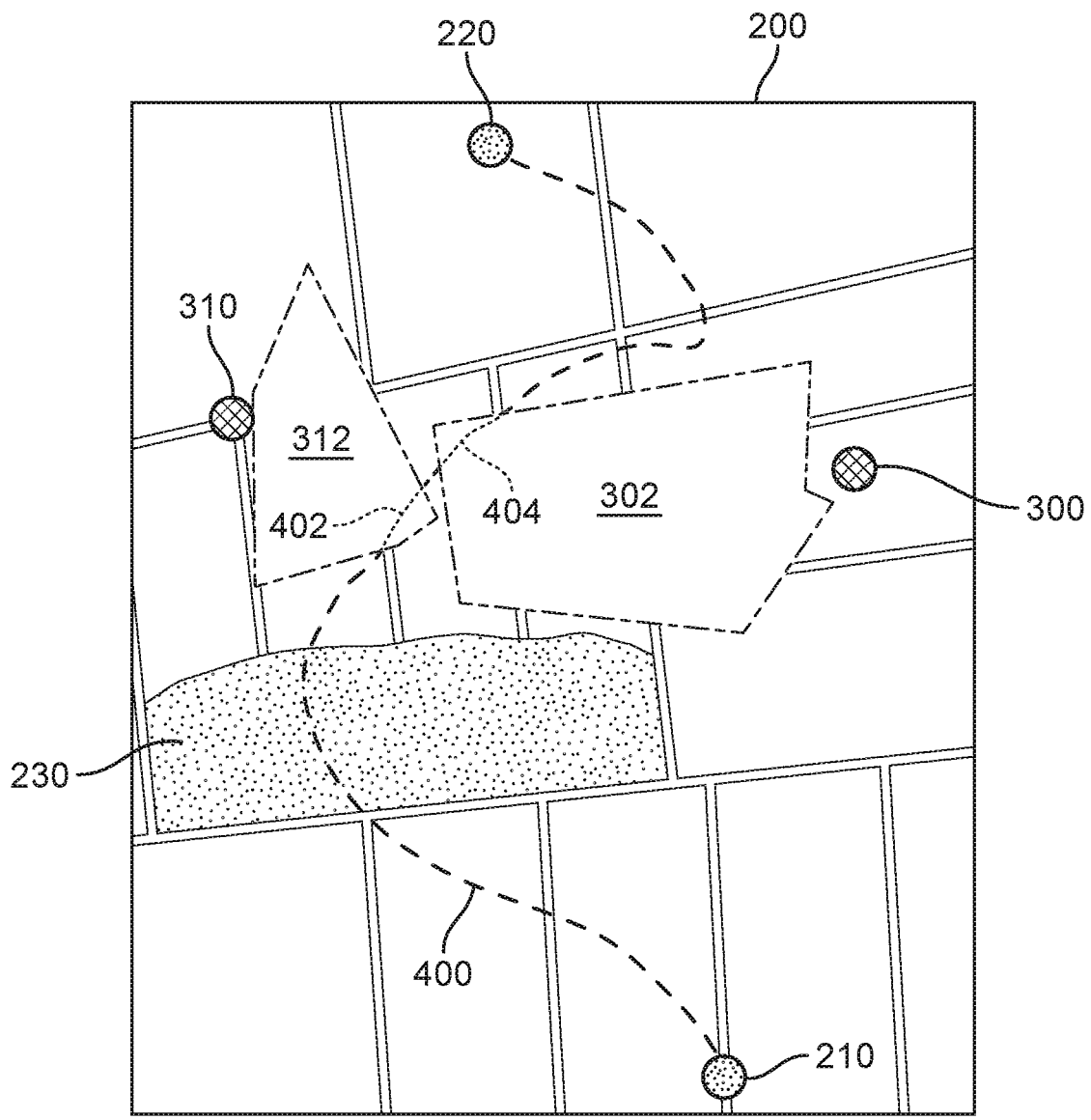
FIG. 4 is a representative diagram of an example embodiment of a route for a vehicle that minimizes a portion of the route within the FOV of observers.

Referring now to FIGS. 2-4, an example of a discreet route for subject vehicle 120 within a target area is illustrated. FIG. 2 illustrates a target area 200, which includes a variety of roads, streets, and other terrain features. In this embodiment, a conventional route 202 for a vehicle is shown from an initial location 210 (e.g., a start point) to a destination location 220 (e.g., an end point or intermediate waypoint) within target area 200. As shown in FIG. 2, conventional route 202 generally follows along existing roads or streets within target area 200 to minimize the total travel distance for the vehicle between initial location 210 and destination location 220. In addition, conventional route 202 omits off-road portions within target area, such as park 230.

FIG. 3 illustrates target area 200 that includes a field-of-view (FOV) for one or more observers. In this embodiment, a first observer 300 and a second observer 310 are located, respectively, at a first location and a second location within target area 200. First observer 300 is associated with a first FOV 302 that covers a first area within target area 200. Second observer 310 is associated with a second FOV 312 that covers a second area within target area 200. In this embodiment, first FOV 302 of first observer 300 and second FOV 312 of second observer 310 are located between initial location 210 and destination location 220 within target area 200. As a result, a conventional route, such as conventional route 202, for a vehicle (e.g., subject vehicle 120) between initial location 210 and destination location 220 would fall within the FOV of one or more observers (e.g., within first FOV 302 and/or second FOV 312).

According to the techniques of the example embodiments described herein, a discreet route between initial location 210 and destination location 220 is determined to avoid or minimize the amount of the route that is within the FOV of the observers. In an example embodiment, an optimal route may be determined according to the following equation:

$$S_{opt} = \arg\min \int_{P_{start}}^{P_{end}} A_{FOV}(p) \left| \left\{ \bigcup_{m=1}^{n} c_m \right\} \right. \quad \text{Equation 1}$$

where $S_{opt}$ is the optimal route, $A_{FOV}$ (p is the area of the viewshed (e.g., FOV) for a given location on the route, and $c_n$ is the nth condition (e.g., restrictions, requirements, or limitations associated with a vehicle or the terrain). Using this equation (e.g., Equation 1), the optimal route for a subject vehicle (i.e., $S_{opt}$) from a first or initial location (i.e., $p_{start}$) to a second or destination location (i.e., $p_{end}$) is the route that minimizes the combined viewsheds (e.g., FOVs) along the route while satisfying all other required conditions.

Referring now to FIG. 4, an example embodiment of a discreet route 400 for subject vehicle 120 that minimizes a portion of the route within the FOV of observers is shown. In this embodiment, rather than minimizing distance or time between initial location 210 and destination location 220, discreet route 400 instead minimizes the amount of the route that is within first FOV 302 of first observer 300 and second FOV 312 of second observer 310. As shown in FIG. 4, discreet route 400 follows a path that is independent of existing roads and streets and may include portions that cross over various types of terrain, such as park 230. In some embodiments, discreet route 400 may take into account limitations or restrictions associated with subject vehicle 120, which may include, but are not limited to, the type of terrain that subject vehicle 120 may cross. For example, in an embodiment in which the subject vehicle is a small sedan not fit for off-road conditions, the discreet route may include a path that follows paved streets (e.g., runs substantially parallel to paved streets).

Discreet route 400 between initial location 210 and destination location 220 includes a first section 402 that only briefly crosses second FOV 312 of second observer 310 and a second section 404 that also only briefly crosses first FOV 302 of first observer 300. Thus, discreet route 400 provides a route for subject vehicle 120 from initial location 210 and destination location 220 that minimizes the amount of discreet route 400 that falls within first FOV 302 and/or second FOV 312.

As shown in FIGS. 3 and 4, target area 200 includes two observers (e.g., first observer 300 and second observer 310) for purposes of description. It should be understood, however, that in a given target area, additional target observers with associated FOVs may be present. The techniques described herein apply to any number of observers or potential observers within a target area.

In some embodiments, adjustments may be made to a map for a given target area, including static adjustments and dynamic adjustments. Static adjustments may include using information associated with the terrain within the target area (e.g., obtained from terrain/elevation data 112, shown in FIG. 1). Static adjustments may include marking certain portions of a target area as unpassable so that these areas are not used when determining the optimal route for a subject vehicle. For example, lakes or other large bodies of water that the subject vehicle cannot traverse, canyons or other land formations that cannot be crossed, or other terrain features that are incompatible with a subject vehicle may be blocked within the target area so that these areas are not considered during route determination.

Additionally, dynamic adjustments may also be taken into account to improve the route determination for a subject vehicle. For example, route determining system 100 may receive real-time data associated with observer locations (e.g., obtained from observer data 110, shown in FIG. 1). Using this real-time data, the FOVs of new observers may be determined and the optimal route for the subject vehicle can be modified to avoid these newly determined FOVs of the new observers within the target area.

In some embodiments, each FOV within the target area may also include a safety threshold or distance from which the determined route for the subject vehicle attempts to avoid. With this adjustment, an optimal route may be determined that avoids getting too close to an observer's FOV. By using a safety threshold or distance for determining the route for the subject vehicle, potential inaccuracies in the data, such as the observer location, observer FOV, elevation data, or other terrain information, may be mitigated or reduced.

In some embodiments, not all observers' locations are known. In these embodiments, potential or likely observer locations, with associated potential or likely FOVs, may be determined and used for calculating the optimal route for the subject vehicle. In an example embodiment, historical data, artificial intelligence, and/or machine learning techniques may be used to determine likely potential locations of unknown observers within the target area. For example, some locations within a target area may provide a good line-of-sight to easily traversed terrain or may be a vantage point with a large viewing area of the target area. Other factors associated with potential observers within the target area may also be used for determining the route for the subject vehicle.

In some embodiments, additional optional features or improvements may be factored into determining a route for a subject vehicle. Some of these optional features include: obtaining and using information associated with known satellite or flight routes to avoid for route determination, considering noise generation by the subject vehicle on different types of ground surfaces, using probabilities of observer locations, taking into consideration visibility at different times of the day or night, taking into account any visibility masking features of the subject vehicle (e.g., camouflage, color, reflectivity, etc.), using time within a FOV as a consideration, using information associated with a cross-sectional area of a subject vehicle relative to an observer's FOV (e.g., approaching an observer's FOV with the front of the subject vehicle presents a smaller cross-sectional area than approaching with the side of the subject vehicle), or other considerations that may be specific to a target area, a subject vehicle, observers, or an environment.

Figure 5:
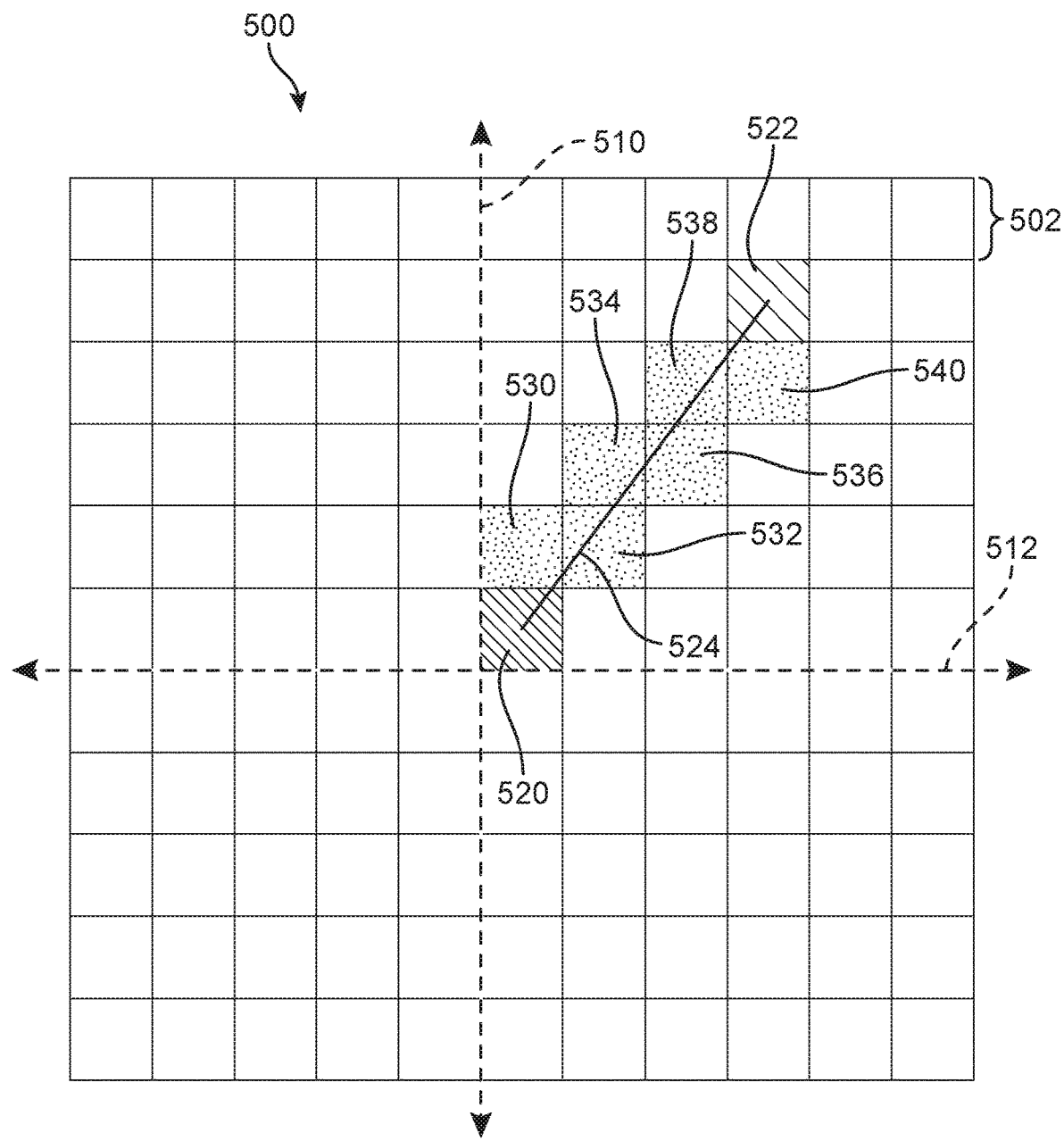
FIG. 5 is a schematic diagram of an example embodiment of a process of determining interposed grid squares between two points.
Figure 6:
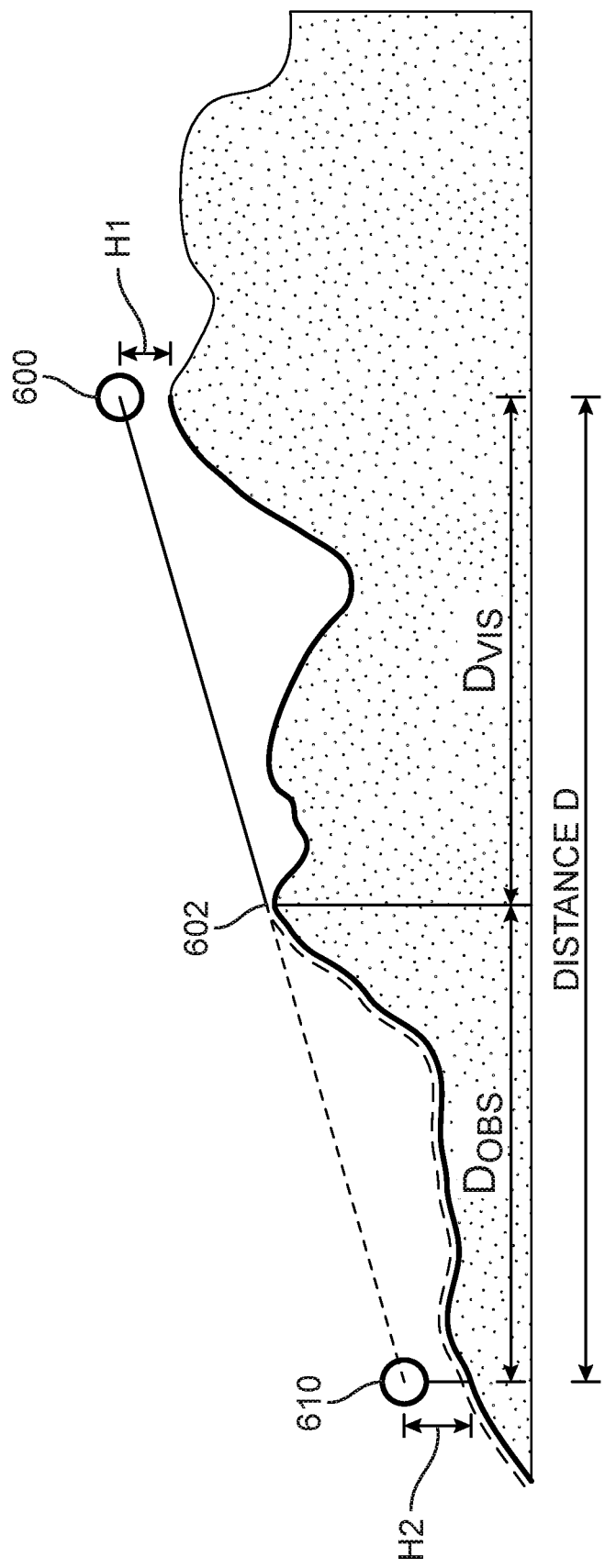
FIG. 6 is a schematic diagram of an example embodiment of using elevation data to determine a FOV from an observer location.
Figure 7:
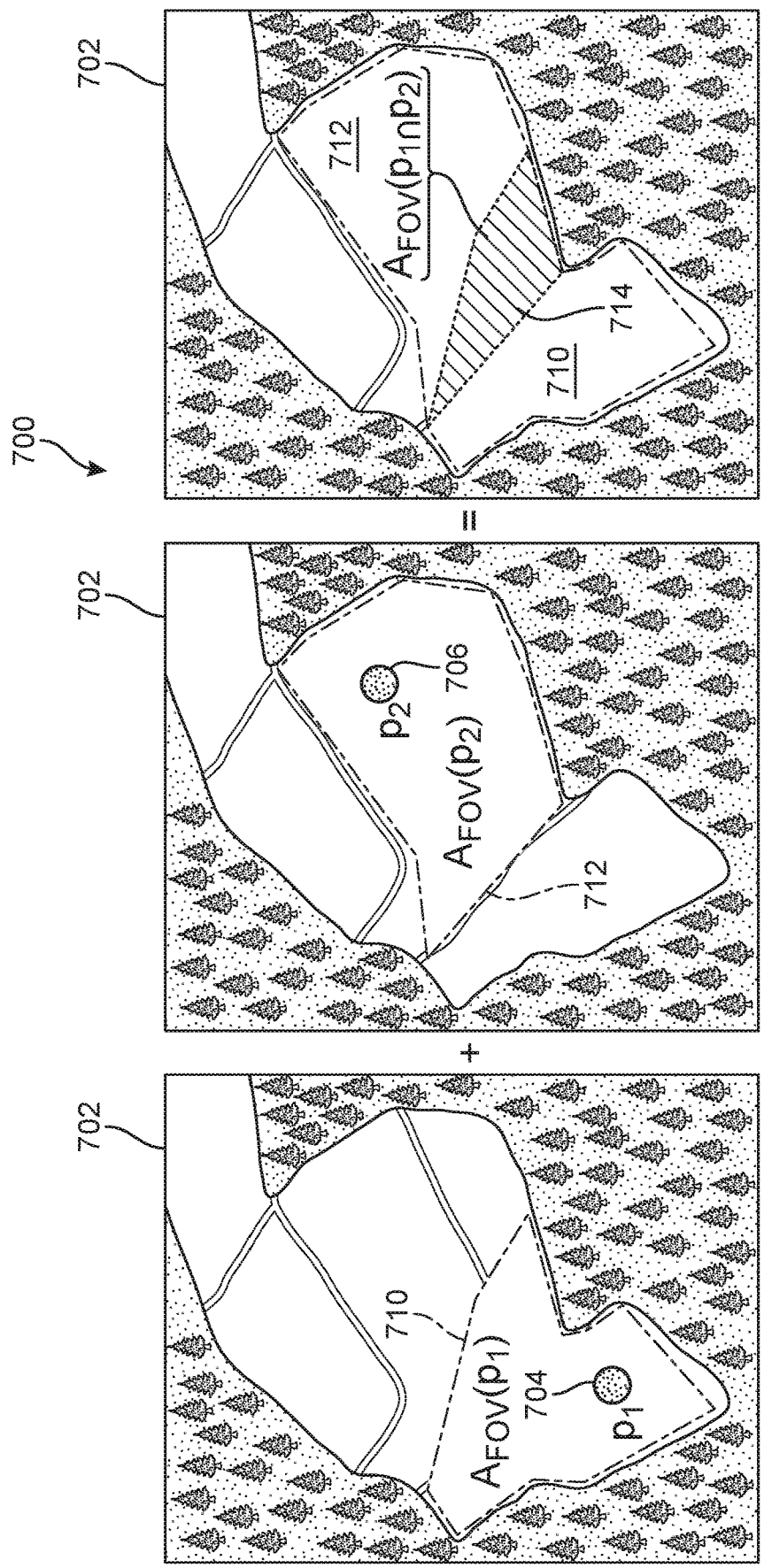
FIG. 7 is a representative diagram of a process for combining multiple FOVs for two or more observers.

Referring now to FIGS. 5-7, details regarding calculation of FOVs for observers and determining an optimal route for a subject vehicle are described. FIG. 5 is a schematic diagram of an example embodiment of a process of determining interposed grid squares between two points, which are used for calculating FOVs for observers. In an example embodiment, a target area (e.g., target area 200) may be represented by a grid zone 500 comprising a plurality of grid squares 502. For example, the target area may be represented by a grid zone using the Military Grid Reference System (MGRS) or other geo-coordinate standard. Using such a grid system coordinate system, grid zone 500 comprises a square area formed by a plurality of grid squares 502 that are equal in number along a first axis 510 (e.g., x-axis) and along a second axis 512 (e.g., y-axis).

In this embodiment, grid zone 500 is an 11×11 square, where each grid square of plurality of grid squares 502 represents an area of approximately 10 square meters. It should be understood that a grid zone for a target area may be represented using grid squares of different sizes, corresponding to different levels of resolution. For example, for higher levels of resolution, a grid zone having grid squares with a smaller size may be used, whereas for lower levels of resolution, a grid zone having grid squares with a larger size may be used. In some embodiments, the selection of grid zone resolution may be determined based on the available resolution of terrain/elevation data for a target area (e.g., based on the resolution of terrain/elevation data 112, shown in FIG. 1).

In an example embodiment, the FOV for an observer may be determined based on a viewshed. A viewshed is a geographical area that is visible from a specific location. The viewshed includes all surrounding points that are within a line-of-sight from that location and excludes points that are beyond the horizon or are obstructed by terrain and/or other features (e.g., buildings, trees, other natural and/or manmade structures).

A typical viewshed analysis uses an elevation value for each cell (e.g., grid square) of a digital elevation model to determine visibility to or from a particular location (i.e., another cell or grid square). For example, to determine whether a target object (e.g., a subject vehicle) of at least a specific height can be seen from an observer having a known height from the ground, two steps are performed. First, the cells or grid squares in front of the target object are determined. Next, the slopes of all of these cells or grid squares in front of the target object are calculated. The target object is visible if none of the calculated slopes is at least as high as the target object slope, including the height of the target object.

A number of conventional viewshed algorithms exist with differing levels of complexity and accuracy. These conventional viewshed algorithms, however, are typically optimized for a single (or small number) viewshed analysis. The discreet routing determined by route determining system 100 of the present embodiments, however, uses a very large number of viewshed analyses as part of determining the FOV for each of the observers within a target area. Accordingly, to provide the number of viewshed analyses for discreet routing, the example embodiments described herein use a new algorithm referred to as an "indexshed".

As used herein and in the claims, an indexshed is a list of all points or coordinates (e.g., cells, grid squares, etc.) within a grid zone (e.g., a target area) up to a maximum distance that, for each of those points, includes all coordinates that are considered to be between the observer and that point (which point may be a potential target object). This may be transformed to a zero-based index around an origin (0,0) and includes n points in all directions from the origin, also referred to as a "halfgrid".

Referring back to FIG. 5, an example embodiment of an indexshed for grid zone 500 is shown with a halfgrid=5. In this embodiment, a potential observer location is represented by an origin grid square 520, located at (0,0) with respect to first axis 510 (e.g., x-axis) and second axis 512 (e.g., y-axis). An indexshed array for each potential target point or grid square from origin grid square 520 located at (0,0) may be calculated for a first quarter of grid zone 500, corresponding to (x,y) along first axis 510 (e.g., x-axis) and second axis 512 (e.g., y-axis). By applying symmetries, the indexshed array for half of the first quarter of grid zone 500 may be copied or mirrored from (x,y) to (y,x) to complete the first quarter.

For example, the upper half of the first quarter of grid zone 500 may be represented by the following indexshed array for halfgrid=5, where the first entry or tuple is the location of the target:

[(0,1)]
[(0,2), (0,1)]
[(0,3), (0,1), (0,2)]
[(0,4), (0,1), (0,2), (0,3)]
[(0,5), (0,1), (0,2), (0,3), (0,4)]
[(1,1), (0,1)]
[(1,2), (0,1), (1,1)]
[(1,3), (0,1), (0,2), (1,1), (1,2)]
[(1,4), (0,1), (0,2), (1,2), (1,3)]
[(2,2), (0,1), (1,1), (1,2)]
[(2,3), (0,1), (1,1), (1,2), (2,2)]
[(2,4), (0,1), (1,1), (1,2), (1,3), (2,3)]
[(3,3), (0,1), (1,1), (1,2), (2,2), (2,3)]
[(3,4), (0,1), (1,1), (1,2), (2,2), (2,3), (3,3)]

As noted above, the remaining lower half of the first quarter of grid zone 500 may be determined by copying or mirroring from (x,y) to (y,x) as follows:

[(1,0)]
[(2,0), (1,0)]
[(3,0), (1,0), (2,0)]
[(4,0), (1,0), (2,0), (3,0)]
[(5,0), (1,0), (2,0), (3,0), (4,0)]
[(1,1), (1,0)]
[(2,1), (1,0), (1,1)]
[(3,1), (1,0), (2,0), (1,1), (2,1)]
[(4,1), (1,0), (2,0), (2,1), (3,1)]
[(2,2), (1,0), (1,1), (2,1)]
[(3,2), (1,0), (1,1), (2,1), (2,2)]
[(4,2), (1,0), (1,1), (2,1), (3,1), (3,2)]
[(3,3), 1,0), (1,1), (2,1), (2,2), (3,2)]
[(4,3), (1,0), (1,1), (2,1), (2,2), (3,2), (3,3)]

Next, the indexshed for the complete first quarter may be copied or mirrored to each of the remaining quarters. For example, a second quarter of grid zone 500 may be mirrored from (x,y) to (-x, y), a third quarter of grid zone 500 may be mirrored from (x,y) to (-x,-y), and a fourth quarter of grid zone 500 may be mirrored from (x,y) to (x,-y). Duplicates on the axes for each quarter are removed after mirroring.

With this arrangement, an indexshed for the entirety of grid zone 500 may be determined. It should be noted that the process of determining an indexshed for a grid zone may be performed in advance for a given target area. The process of determining the indexshed may be time consuming, depending on the available processing resources. In some embodiments, because the visibility of each target point is independent of other target points, the calculation of the indexshed for a target area may be implemented as a massively parallel graphical processing unit (GPU) computation. Therefore, by performing the indexshed determination ahead of time, the resulting indexshed may be used by route determining system 100 to determine a discreet route for subject vehicle 120 in real-time.

As described above, the indexshed determined for grid zone 500 may be used for determining the grid squares located in front of a target object. As shown in FIG. 5, a target object (e.g., subject vehicle 120) is located at a target grid square 522, located at (3,4) with respect to first axis 510 (e.g., x-axis) and second axis 512 (e.g., y-axis). A line 524 drawn on grid zone 500 from target grid square 522 to origin grid square 520 intersects the coordinates (i.e., grid squares) that are considered to be in front of the target object at target grid square 522.

In this embodiment, the coordinates or points in front of target grid square 522 comprise a plurality of interposed grid squares, including a first interposed grid square 530 located at (0,1), a second interposed grid square 532 located at (1,1), a third interposed grid square 534 located at (1,2), a fourth interposed grid square 536 located at (2,2), a fifth interposed grid square 538 located at (2,3), and a sixth interposed grid square 540 located at (3,3).

Referring back to the indexshed determined for grid zone 500, the entry for a target location corresponding to (3,4) results in identifying the coordinates or grid squares located in front of that location, i.e., (0,1), (1,1), (1,2), (2,2), (2,3), (3,3). These locations correspond to the locations of the interposed grid squares 530, 532, 534, 536, 538, and 540 between target grid square 522 (i.e., the location of a subject vehicle) and origin grid square 520 (i.e., the location of an observer). With this arrangement, an indexshed for a target area may be used to determine the coordinates (e.g., grid squares) located in front of any point within grid zone 500 for the target area.

Once the indexshed for a target area is determined, elevation data for the coordinates (e.g., grid squares) may be applied to the target area to determine visibility between any two points or grid squares within the target area. In an example embodiment, the elevation data (e.g., terrain/elevation data 112, shown in FIG. 1) may be provided in the form of a two-dimensional elevation array. This two-dimensional elevation array of the target area is loaded in a way such that the indices in the elevation array refer to the indexshed notation for the target area.

The result is a two-dimensional binary array of dimension equal to (2*halfgrid+1)*(2*halfgrid+1). For example, using an elevation grid of 10 m and an indexshed with a halfgrid of 500 allows determination of the visibility (e.g., FOV) of all points up to 5 km from an observer in each direction. With this configuration, FOVs of one or more observers within the target area may be determined. Additionally, this technique may also be used to determine the FOV from the perspective of the subject vehicle or target object, for example, to be used in circumstances where no known observers are located within the target area.

Once all of the points or grid squares in front of a target object are determined, for example, using the indexshed process described above, the elevation data is applied and the slopes of all of the grid squares in front of the target object are calculated. As described above, a target object is visible if none of the calculated slopes is at least as high as the target object slope, including the height of the target object.

Referring now to FIG. 6, an example embodiment of using elevation data to determine a FOV from an observer location is illustrated. In this embodiment, an observer 600 has a first height H1 above the ground and is located a distance D away from a target object 610. For example, target object 610 may be subject vehicle 120, described above. Target object 610 has a second height H2 above the ground at its location. The elevation data is applied to the terrain within the target area that includes observer 600 and target object 610.

In this embodiment, the slope of at least one portion of the terrain is higher than the slope of target object 610. As a result, the portion of the terrain in front of observer 600 extending to a visibility distance $D_{VIS}$ can be seen from the observer's location. However, because of a high point 602 in the terrain, the portion of the terrain past high point 602, illustrated as an obscured distance $D_{OBS}$, is not visible to observer 600. As a result, target object 610 located second height H2 above the ground is within obscured distance $D_{OBS}$ and is therefore not within the FOV of observer 600.

In example embodiments, the determination of the FOV of the observer depends on the heights of both the observer and the target object. In an example embodiment, first height H1 and second height H2 may be approximately 3 meters. In other embodiments, the heights may vary depending on the type of target object, for example, different types of subject vehicles may have different heights, and the height of an observer, for example, an observer may be a person standing on the ground or may be in a structure that is raised an additional amount above the ground. In these embodiments, the FOV of the observer and the target object are determined based on their specific heights. In an example embodiment, potential FOVs in the target area may be determined in advance based on a default observer and target object height (e.g., 3 meters).

In some embodiments, route determining system 100 may determine FOVs of multiple observers for determining the optimal route for subject vehicle 120. For example, as shown in FIGS. 2-4, two non-overlapping FOVs for two observers are illustrated. In scenarios with multiple observers, however, often FOVs of two or more observers will overlap, at least partially, within a target area. Accordingly, in an example embodiment, one or more combined FOVs may be determined for portions of the target area where the FOV of two or more observers overlap.

FIG. 7 is a representative diagram of a process 700 for combining multiple FOVs for two or more observers. In some embodiments, two or more FOVs of different observers may overlap in portions of a target area. In these situations, in order to combine the FOVs, the overlapping area of the two or more FOVs should be subtracted. For example, process 700 shown in FIG. 7 illustrates two FOVs within a target area 702. In this embodiment, a first observer 704 located at a first location (e.g., $p_1$) within target area 702 has a first FOV 710 with an area determined by $A_{FOV}(p_1)$. A second observer 706 located at a second location (e.g., $p_2$) within target area 702 has a second FOV 712 with an area determined by $A_{FOV}(p_2)$.

The combined FOV for first observer 704 and second observer 706 includes an overlapping portion 714 where first FOV 710 and second FOV 712 overlap with each other. As a result, the combined FOV is not represented by adding up each separate area of each of the FOVs, which would be $A_{FOV}(p_1)+A_{FOV}(p_2)$. Instead, the combined FOV for first observer 704 and second observer 706 is determined by subtracting overlapping portion 714 according to the following equation:

$$A_{FOV}(p_1 \cup p_2) = A_{FOV}(p_1) + A_{FOV}(p_2) - A_{FOV}(p_1 \cup p_2)$$

In some embodiments, viewsheds or FOVs for observers may be stored as binary viewsheds. In these embodiments, combining two or more binary viewsheds to determine a combined FOV that subtracts overlapping portions is achieved by using a "bitwise or" operator. For a given target area, a grid zone is used to determine coordinates of a viewshed or FOV of an observer. Each observer's viewshed or FOV is saved as a binary viewshed that includes a single line of 8-bit numbers. To combine all FOVs or viewsheds of all observers along a given route in a target area, a three step process may be implemented.

First, the indices of all the locations (e.g., grid square of the observer) where a FOV or viewshed has been calculated for an observer are determined. Next, each of the multiple FOVs or viewsheds are added together using the bitwise or operator (i.e., "I" operator). Finally, the set bits are re-transformed to coordinates that are visible. The result is a combined viewshed or FOV that includes all portions of the target area (e.g., grid squares) that are within the FOV of an observer. With this configuration, the bitwise or operator provides an efficient mechanism for quickly combining multiple FOVs from two or more observers within a target area.

In one embodiment, determining the optimal route for a subject vehicle may include using a routing algorithm to minimize FOV (e.g., viewshed) area along waypoints from a start point to an end point. In this case, the discreet routing technique of the present embodiments uses the incremental viewshed area that is gained moving from waypoint A to waypoint B, combining the viewsheds for each waypoint along the route. For example, using the following equation:

$$dist_{AB} = (viewshed_A | viewshed_B) - viewshed_A$$

A graph can be created with the distance to each potential waypoint with its eight neighbors, with the distance provided in a graph matrix by setting graph [$waypoint_A$, $waypoint_B$]=dist AB. For a square area with a viewshed grid of n columns/rows, this leads to a sparse matrix with dimension (n*n, n*n), but only 8*n*n elements, with the rest being zero. A routing algorithm, for example, the Dijkstra algorithm, may then be used to solve for the shortest path, which in this case represents the smallest combined value for the FOV or viewshed between the starting and ending locations.

Figure 8:
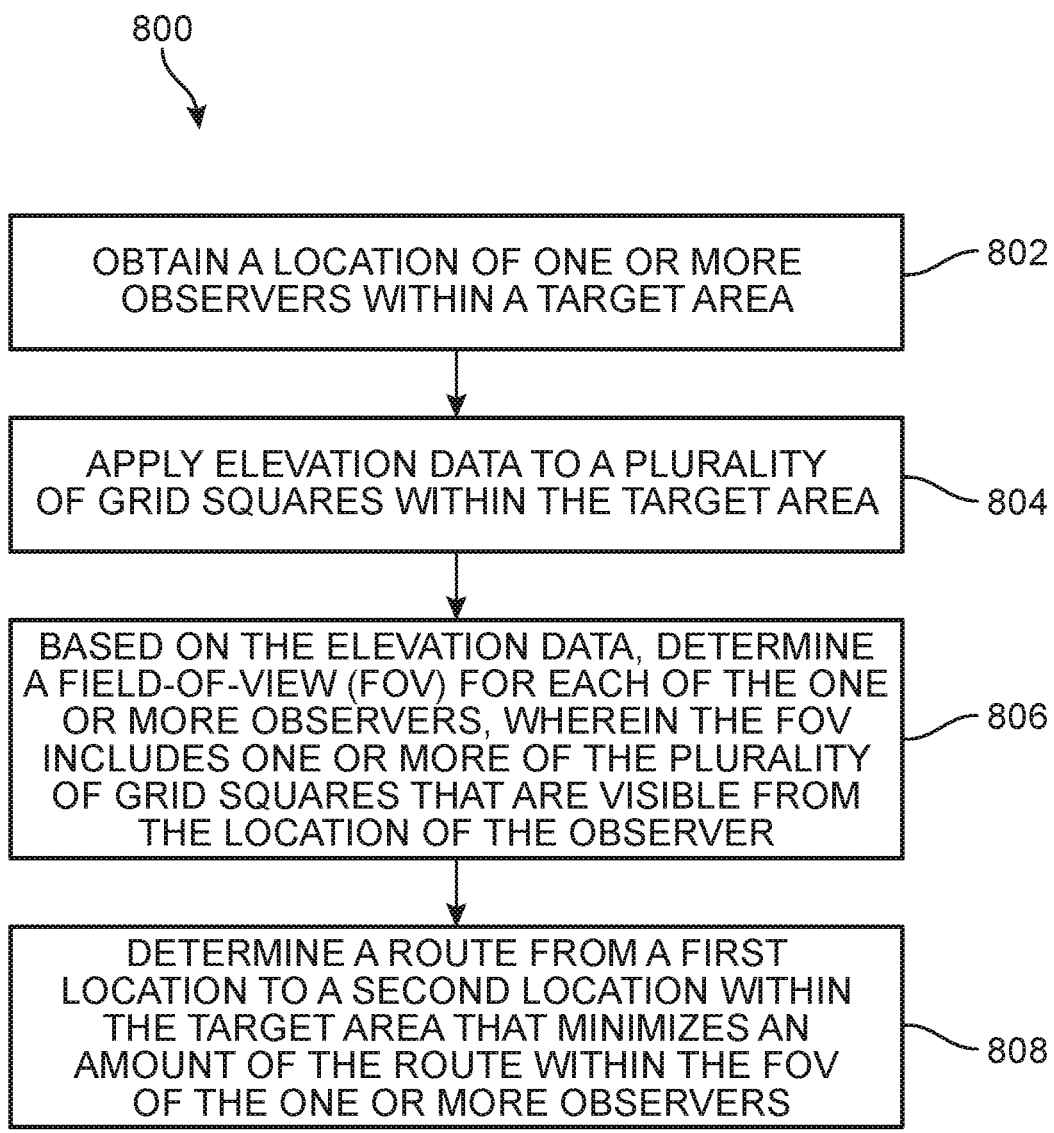
FIG. 8 is a flowchart illustrating an example embodiment of a method for determining a route for a vehicle.

FIG. 8 is a flowchart illustrating a method 800 for determining a discreet route for a subject vehicle according to an example embodiment. In some embodiments, method 800 may be implemented by a route determining system, for example, route determining system 100, described above. In this embodiment, method 800 begins with an operation 802. At operation 802, a location of one or more observers within a target area is obtained or determined. For example, as shown in FIG. 1, route determining system 100 receives observer data 110 associated with locations of one or more observers within a target area.

Next, at an operation 804, method 800 includes applying elevation data to a plurality of grid squares within the target area. For example, elevation data associated with a plurality of coordinates or grid squares within the target area may be received by route determining system 100 from terrain/elevation data 112, as shown in FIG. 1. In some embodiments, method 800 may include one or more operations that may be performed in advance of determining a discreet route for a specific subject vehicle. For example, as described in reference to FIGS. 5 and 6, in some embodiments, an indexshed for a target area may be determined in advance. With this arrangement, operation 804 may apply the elevation data to a predetermined indexshed of the target area.

At an operation 806, a FOV for each of the one or more observers is determined based on the elevation data from operation 804. At operation 806, the determined FOV includes one or more of the plurality of grid squares that are visible from the location of the observer. For example, the FOV for each observer may be determined as described above, and may further include determining combined FOVs for any FOVs that include overlapping portions. In an example embodiment, operation 806 may use an indexshed for the target area with applied elevation data for the target area, including heights of the subject vehicle and observers, to determine FOVs for the observers within the target area.

Method 800 further includes an operation 808, where a route from a first location to a second location is determined within the target area that minimizes an amount of the route within the FOV of the one or more observers. For example, as shown in FIG. 4, route determining system 100 may determine discreet route 400 for subject vehicle 120 from initial location 210 and destination location 220 that minimizes the amount of discreet route 400 that falls within first FOV 302 and/or second FOV 312. In some embodiments, method 800 may end upon determination of the route for a single subject vehicle and may be implemented repeatedly for additional subject vehicles. In other embodiments, method 800 may include real-time monitoring and updating of a discreet route based on changes to any of the input data, including, for example, changes in numbers or locations of observers, changes associated with the subject vehicle, or other factors that may lead to dynamically adjusting or updating the discreet route for the subject vehicle.

Figure 9:
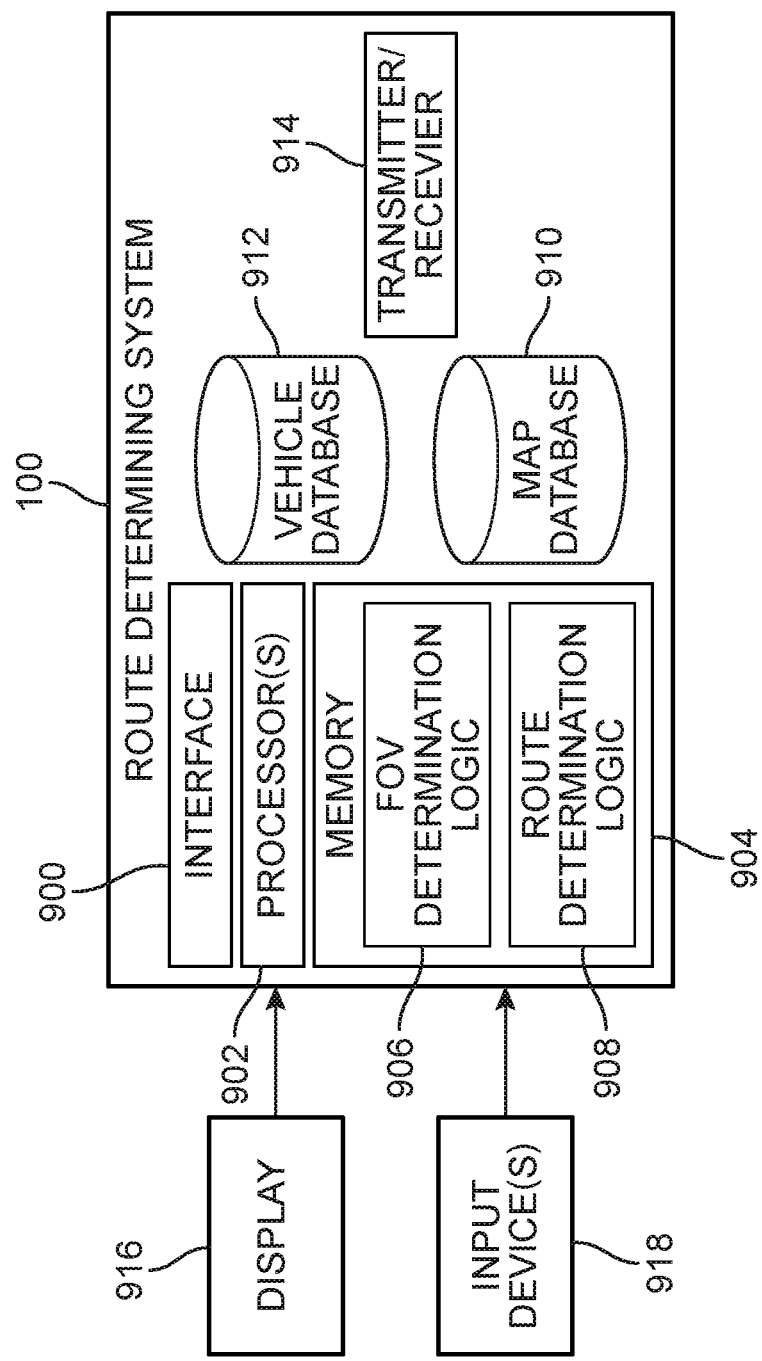
FIG. 9 is a block diagram of an example embodiment of a route determining system.

FIG. 9 is a block diagram of an example embodiment of route determining system 100. The various techniques according to the embodiments described herein may be implemented in hardware, software, or a combination thereof. In an example embodiment, route determining system 100 is configured to perform the operations described above and depicted in connection with FIGS. 1-8 above. In this embodiment, route determining system 100 includes an interface 900, one or more processors 902, a memory 904, a map database 910, and a transmitter/receiver 914.

Interface 900 may be any type of interface that allows route determining system 100 to communicate with users and/or other computers or systems. For example, in some embodiments, route determining system 100 may be implemented as part of a battlefield management system. In such an embodiment, interface 900 may allow route determining system 100 to communicate with the battlefield management system. In other embodiments, route determining system 100 may be implemented on a computer or other device and interface 900 may be configured to permit a user to interact with route determining system 100. In one embodiment, route determining system 100 may optionally include a display 916, such as a screen or other output, and one or more input devices 918, such as a keyboard, mouse, stylus, touch screen, etc., to allow a user to interact with route determining system 100.

Processor 902 may be a microprocessor or microcontroller configured to implement operations associated with functions of route determining system 100. Processor 902 executes instructions associated with software stored in memory 904. Specifically, memory 904 stores instructions for various control logic that, when executed by the processor 902, causes processor 902 to perform various operations on behalf of route determining system 100 as described herein. In this embodiment, memory 904 includes at least a FOV determination logic 906 and a route determination logic 908. FOV determination logic 906 is configured to implement operations associated with determining a FOV of one or more observers, for example, as described above in reference to FOV determination module 102 and/or operation 806 of method 800. Route determination logic 908 is configured to implement operations associated with determining a discreet route for a subject vehicle, for example, as described above in reference to route determination module 104 and/or operation 808 of method 800.

Memory 904 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, memory 904 may comprise one or more tangible (non-transitory) computer readable storage media (e.g., a memory device) encoded with software comprising computer executable instructions and when the software is executed (by the processor 902) it is operable to perform operations described herein.

Transmitter/receiver 914 facilitates communications between route determining system 100 and other computers and devices, including subject vehicle 120. For example, transmitter/receiver 914 may be configured to send discreet routing information to subject vehicle 120, including modifications and/or updates to the route based on real-time data. Additionally, transmitter/receiver 914 may be configured to receive information, including, for example, one or more of observer data 110, terrain/elevation data 112, or vehicle data 114, from other databases or devices for use by route determining system 100 as described herein.

In some embodiments, route determining system 100 may also include map database 910, which is used to store data associated with one or more target areas, including indexsheds, elevation data, terrain data, and other information about target areas that may be used by route determining system 100. Additionally, in some embodiments, an optional vehicle database 912 may be included in route determining system 100. Vehicle database 912 may store information associated with various types or kinds of subject vehicles, including vehicle characteristics, requirements, restrictions, limitations, etc., that may be used by route determining system 100.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for determining a route for a subject vehicle, the method performed by a system comprising a processor and comprising:

obtaining, by at least one sensor, a first observer location of a first observer and a second observer location of a second observer;

determining, by a field-of-view FOV determination module of the processor, a plurality of grid squares in a target area including the first observer location, the second observer location, a subject vehicle initial location, and a subject vehicle destination location;

obtaining, by the FOV determination module, elevation data for the target area;

applying, by the FOV determination module, the elevation data to the plurality of grid squares within the target area;

determining, by the FOV determination module, a first observer FOV for the first observer and a second observer FOV for the second observer, the first observer FOV and the second observer FOV both based on the elevation data, the first observer FOV including one or more of the plurality of grid squares that are visible from the first observer location, the second observer FOV including one or more of the plurality of grid squares that are visible from the second observer location;

combining the first observer FOV with the second observer FOV and subtracting a portion of the first observer FOV that overlaps with the second observer FOV to generate a combined FOV;

determining, by a route determination module of the processor, a route for the subject vehicle, the route traversing from the subject vehicle initial location to the subject vehicle destination location, and wherein determining the route includes minimizing an amount of the route being within the combined FOV; and displaying the route for the subject vehicle via an interface, wherein the interface includes a display inside the subject vehicle.

2. The method of claim 1, wherein the at least one sensor is a component of a global positioning system.

3. The method of claim 1, wherein determining the route further includes satisfying at least one of:

a maximum weight restriction, a terrain restriction, avoidance of densely populated areas, or limitations associated with a type of subject vehicle.

4. The method of claim 1, wherein both of the first observer location and the second observer location are obtained from real-time data.

5. The method of claim 1, wherein applying the elevation data further comprises including at least one of:

elevation data associated with terrain within the target area, a height of one of the first observer or the second observer, or a height of the subject vehicle.

6. The method of claim 1, further comprising:

determining, for each grid square of the plurality of grid squares within the target area, a set of interposed grid squares that are located between the grid square and a target grid square, and wherein applying the elevation data further comprises:

applying the elevation data to one or more grids of interposed grid squares that are located between a location of one of the first observer or the second observer and a target grid square; and based on the applied elevation data, determining whether the target grid square is visible to the one of the first observer or the second observer.

7. The method of claim 5, wherein generating the combined FOV is performed according to the following equation:

$$A_{FOV}(p_1 \cup p_2) = A_{FOV}(p_1) + A_{FOV}(p_2) - A_{FOV}(p_1 \cup p_2)$$

8. A system for determining a route for a subject vehicle, the system comprising:
   at least one interface configured to receive data;
   a memory in communication with the at least one interface; and
   a processor in communication with the at least one interface and the memory, wherein the processor, wherein the processor includes a field-of-view (FOV) determination module and a route determination module and is configured to:
   receive from at least one sensor a first observer location of a first observer and a second observer location of a second observer;
   determine, by the FOV determination module of the processor, a plurality of grid squares in a target area including the first observer location, the second observer location, a subject vehicle initial location, and a subject vehicle destination location;
   obtain, by the FOV determination module, elevation data for the target area;
   apply, by the FOV determination module, the elevation data to the plurality of grid squares within the target area;
   determine, by a FOV determination module, a first observer FOV for the first observer and a second observer FOV for the second observer,
   the first observer FOV and the second observer FOV both based on the elevation data,
   the first observer FOV including one or more of the plurality of grid squares that are visible from the first observer location,
   the second observer FOV including one or more of the plurality of grid squares that are visible from the second observer location;
   combine the first observer FOV with the second observer FOV and subtract a portion of the first observer FOV that overlaps with the second observer FOV to generate a combined FOV;
   determine, by the route determination module, a route for the subject vehicle,
   the route traversing from the subject vehicle initial location to the subject vehicle destination location, wherein determining the route includes minimizing an amount of the route being within the combined FOV; and
   display the route for the subject vehicle via an interface, wherein the interface includes a display inside the subject vehicle.

9. The system of claim 8, wherein the processor is further configured to:
   determine, for each grid square of the plurality of grid squares within the target area, a set of interposed grid squares that are located between the grid square and a target grid square, and
   wherein applying the elevation data further comprises:
   applying the elevation data to one or more grids of interposed grid squares that are located between a location of one of the first observer or the second observer and a target grid square; and
   based on the applied elevation data, determining whether the target grid square is visible to the one of the first observer or the second observer.

10. The system of claim 8, wherein applying the elevation data further comprises including at least one of:
    elevation data associated with terrain within the target area, or
    a height of the subject vehicle.

11. The system of claim 9, wherein generating the combined FOV is performed according to the following equation:

$$A_{FOV}(p_1 \cup p_2) = A_{FOV}(p_1) + A_{FOV}(p_2) - A_{FOV}(p_1 \cup p_2)$$

12. The system of claim 8, wherein determining the route further includes satisfying at least one of:
    a maximum weight restriction,
    a terrain restriction,
    avoidance of densely populated areas, or
    limitations associated with a type of subject vehicle.

13. The system of claim 8, wherein the combined FOV is determined from real-time data.

14. One or more non-transitory computer readable storage media encoded with instructions that, when executed by a processor of a system for determining a route for a subject vehicle, causes the processor to:
    obtain, by at least one sensor, a first observer location of a first observer and a second observer location of a second observer;
    determine, by a field-of-view FOV determination module of the processor, a plurality of grid squares in a target area including the first observer location, the second observer location, a subject vehicle initial location, and a subject vehicle destination location;
    obtain, by the FOV determination module, elevation data for the target area;
    apply, by the FOV determination module, the elevation data to the plurality of grid squares within the target area;
    determine, by a FOV determination module, a first observer FOV for the first observer and a second observer FOV for the second observer,
    the first observer FOV and the second observer FOV both based on the elevation data,
    the first observer FOV including one or more of the plurality of grid squares that are visible from the first observer location,
    the second observer FOV including one or more of the plurality of grid squares that are visible from the second observer location;
    combine the first observer FOV with the second observer FOV and subtract a portion of the first observer FOV that overlaps with the second observer FOV to generate a combined FOV;
    determine, by a route determination module of the processor, a route for the subject vehicle,
    the route traversing from the subject vehicle initial location to the subject vehicle destination location, wherein determining the route includes minimizing an amount of the route being within the combined FOV; and
    display the route for the subject vehicle via an interface, wherein the interface includes a display inside the subject vehicle.

15. The non-transitory computer readable storage media of claim 14, wherein determining the route includes
    minimizing a cross-sectional area of the subject vehicle within the combined FOV.

16. The non-transitory computer readable storage media of claim 14, wherein applying the elevation data further comprises including a height of the first observer,
   a height of the second observer, and
   a height of the subject vehicle.

17. The non-transitory computer readable storage media of claim 14, wherein the instructions further cause the processor to:
   determine, for each grid square of the plurality of grid squares within the target area, a set of interposed grid squares that are located between the grid square and a target grid square, and
   wherein applying the elevation data further comprises:
      applying the elevation data to one or more grids of interposed grid squares that are located between a location of one of the first observer or the second observer and a target grid square; and
based on the applied elevation data, determining whether the target grid square is visible to the one of the first observer or the second observer.

18. The non-transitory computer readable storage media of claim 17, wherein generating the combined FOV is performed according to the following equation:

$$A_{FOV}(p_1 \cup p_2) = A_{FOV}(p_1) + A_{FOV}(p_2) - A_{FOV}(p_1 \cup p_2)$$

19. The non-transitory computer readable storage media of claim 14, wherein the first observer location and the second observer location are obtained from real-time data.

20. The non-transitory computer readable storage media of claim 14, wherein determining the route includes avoiding the combined FOV.

* * * * *

UNITED STATES PATENT AND TRADEMARK OFFICE
CERTIFICATE OF CORRECTION

PATENT NO. : 11,454,505 B2
APPLICATION NO. : 16/551041
DATED : September 27, 2022
INVENTOR(S) : Claudio Peter Daniel Seidler It is certified that error appears in the above-identified patent and that said Letters Patent is hereby corrected as shown below:

On the Title Page

Item [30], insert --April 8, 2019 (DE) .......... 10 2019 002 574.1--

Signed and Sealed this
First Day of November, 2022

Katherine Kelly Vidal
Director of the United States Patent and Trademark Office